US008814218B2

(12) United States Patent
Liu et al.

(10) Patent No.: US 8,814,218 B2
(45) Date of Patent: Aug. 26, 2014

(54) STICKER WITH SECURITY ARRANGEMENT

(71) Applicants: An-Hsia Liu, Torrance, CA (US); Wen-Shueh M. Liu, Torrance, CA (US); Victor D. Liu, Torrance, CA (US); Alexander D. Liu, Torrance, CA (US)

(72) Inventors: An-Hsia Liu, Torrance, CA (US); Wen-Shueh M. Liu, Torrance, CA (US); Victor D. Liu, Torrance, CA (US); Alexander D. Liu, Torrance, CA (US)

( * ) Notice: Subject to any disclaimer, the term of this patent is extended or adjusted under 35 U.S.C. 154(b) by 0 days.

(21) Appl. No.: 13/646,522

(22) Filed: Oct. 5, 2012

(65) Prior Publication Data

US 2013/0026748 A1 Jan. 31, 2013

Related U.S. Application Data

(62) Division of application No. 12/800,624, filed on May 18, 2010, now Pat. No. 8,312,655.

(51) Int. Cl.

| | |
|---|---|
| ***G09F 3/20*** | (2006.01) |
| ***G09F 3/04*** | (2006.01) |
| ***G09F 3/10*** | (2006.01) |
| ***G09F 3/00*** | (2006.01) |
| ***B32B 9/00*** | (2006.01) |
| ***B32B 33/00*** | (2006.01) |

(52) U.S. Cl.
USPC ....... 283/81; 40/6; 40/630; 40/674; 428/40.1; 428/43

(58) Field of Classification Search
USPC ............. 283/81; 428/40.1, 43; 40/6, 630, 674
See application file for complete search history.

(56) References Cited

U.S. PATENT DOCUMENTS

| | | | | |
|---|---|---|---|---|
| 4,214,024 | A * | 7/1980 | Jacobson | 428/43 |
| RE32,490 | E * | 9/1987 | Jenkins | 283/81 |
| 7,166,345 | B2 * | 1/2007 | Myers et al. | 428/40.1 |

FOREIGN PATENT DOCUMENTS

JP 2003036026 * 2/2003

OTHER PUBLICATIONS

Derwent Abstract of JP2003036026.*

* cited by examiner

*Primary Examiner* — Kyle Grabowski
(74) *Attorney, Agent, or Firm* — Raymond Y. Chan; David and Raymond Patent Firm

(57) ABSTRACT

A sticker includes a backing layer, a sticker body including a top layer and an adhesive layer, and a security arrangement cutting through the top layer only and being stopped at an adhesive layer to ensure the sticker body being completely removed from the backing layer without tearing the top layer apart. The security arrangement includes a plurality of lead edge notches evenly provided along the outer flange of the top layer, and a cutting line structure formed at the top layer. After the sticker body is completely removed from the backing layer and is applied for sticking on an object surface, the sticker body becomes a self-destructive layer by the security arrangement to be torn apart at the time when the sticker body is removed from the object surface so as to ensure the sticker body being unable to be removed completely from the object surface.

8 Claims, 8 Drawing Sheets

STICKER WITH SECURITY ARRANGEMENT

CROSS REFERENCE OF RELATED APPLICATION

This is a divisional application of that claims the benefit of priority under 35 U.S.C. §119(e) to a non-provisional application, application Ser. No. 12/800,624, filed May 18, 2010, which is a non-provisional application of a provisional application, application No. 61/283,330, filed Dec. 1, 2009.

BACKGROUND OF THE PRESENT INVENTION

1. Field of Invention

The present invention relates to a sticker, and more particularly to a sticker with a security arrangement, so that after the sticker is tore, the sticker is damaged for security purpose.

2. Description of Related Arts

The stickers, such as recognition stickers or elongated tape like sticker, are commonly used for labeling a product or sealing an envelope, wrapping box, or a conjunction gap of a device casing to prevent the users breaking down the device themselves. The stickers may be also used as a label for insuring the quality of the product is checked and inspected with the attached sticker. The related information of the product, such as product series number or dates of manufacturing, may further printed on the sticker label for organizing and tracking the products.

In order to recognize the removed stickers to prevent the sticker is being replaced or resealed, a plurality of cuts may further provided on the sticker to form the weakened portions thereat, so that after the sticker is tore or removed, the sticker is damaged to prevent the sticker being re-attached on the object or product, so as to recognize the removed sticker to prevent the sealed casing or wrapping box being illegally and privately opened. Therefore, the sticker is formed a plurality of incomplete portions after being tore or removed.

Traditionally, the sticker has one adhesive side and a graphical side for printing or writing patterns or information thereon. The sticker is usually sticky on a supporting base having a smooth surface thereon for the sticker being removably and adhesively attached on the smooth surface of the supporting base, such that when the sticker is able to be easily removed from the supporting base to be firmly stuck onto an object.

However, the sticker with the plurality of cuts thereon tends to be deformed or twisted after removed from the supporting base, so that it is difficult to completely remove the sticker from the supporting base. The sticker, thus, may be hard to smoothly adhere on the surface of the object. It could cause the security problems, such as hard to recognize the tore sticker of the wrapping box, or cause the defect of the manufacturing process of the products.

SUMMARY OF THE PRESENT INVENTION

An object of the present invention is to provide a sticker with security arrangement, wherein the sticker has at least one cutting portion provided thereon to form the security arrangement, so that the sticker is damaged after being removed from an object.

Another object of the present invention to provide a sticker with security arrangement, wherein the cutting lines are formed by cut through the top layer only and stop at the adhesive layer of the sticker body for weaken the top layer for being easily split to tear or damage the top layer, so as to provide the security arrangement to prevent the sticker being removed and re-attached in an unauthorized manner.

Another object of the present invention is to provide a sticker with security arrangement, wherein guide cuts of the cutting lines are radially formed at the sticker, so that when the sticker is removing from a surface of an object, the sticker is relatively easier to be tore along any of the cutting lines in accordance with the direction that a tearing force applied on the sticker.

Another object of the present invention is to provide a sticker with security arrangement, wherein at least one dotted cut is provided to intersect one or more of the guide cuts to further weaken the cutting portion.

Another object of the present invention is to provide a sticker with security arrangement, wherein a plurality of connecting joints are provided for interconnecting a non cutting area of the sticker body, so that the sticker is able to remain the completion thereof.

Another object of the present invention is to provide a sticker with security arrangement, wherein a plurality longer main guide cuts and shorter supporting guide cuts are alternatively provided between the jointing zone and the peripheral edge of the sticker body, so that the cutting portion is able to be weakened while being able to smoothly and easily remove from the backing layer.

Accordingly, in order to accomplish the above objects, the present invention provides a sticker, which comprises a backing layer;

a sticker body, which comprises an adhesive layer and a top layer detachably attached to the backing layer via the adhesive layer; and a security arrangement, which comprises a plurality of cutting lines and a plurality of connecting joints provided at the top layer of the sticker body, wherein the cutting lines are formed by cut through the top layer only and stop at the adhesive layer, wherein the connecting joints are provided between two or more cutting lines for interconnecting a non cutting portion of the top layer, such that the security arrangement is able to weaken the top layer while maintaining a completion of the top layer while transferring the sticker body to attach to an object surface.

These and other objectives, features, and advantages of the present invention will become apparent from the following detailed description, the accompanying drawings, and the appended claims.

DETAILED DESCRIPTION OF THE PREFERRED EMBODIMENT

Figure 1:
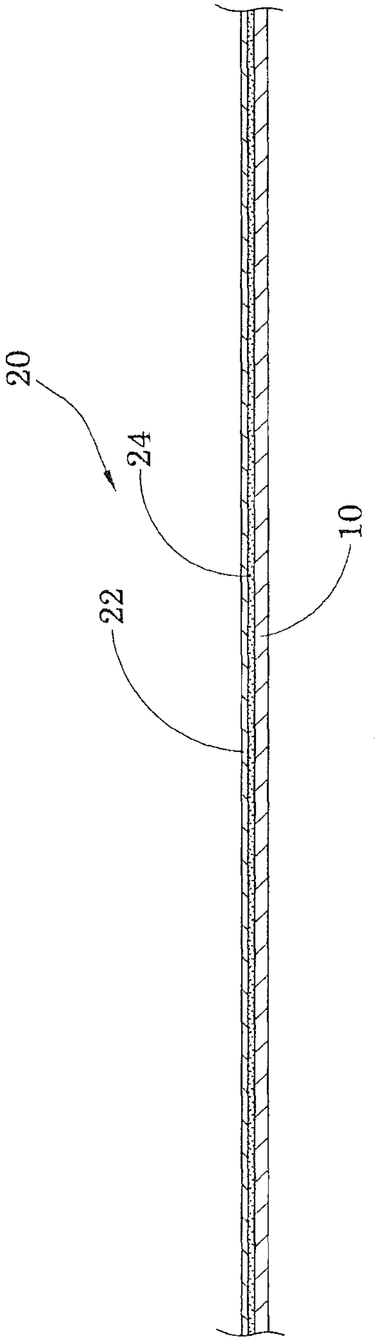
FIG. 1 is a sectional view of a sticker according to a first preferred embodiment of the present invention.
Figure 2:
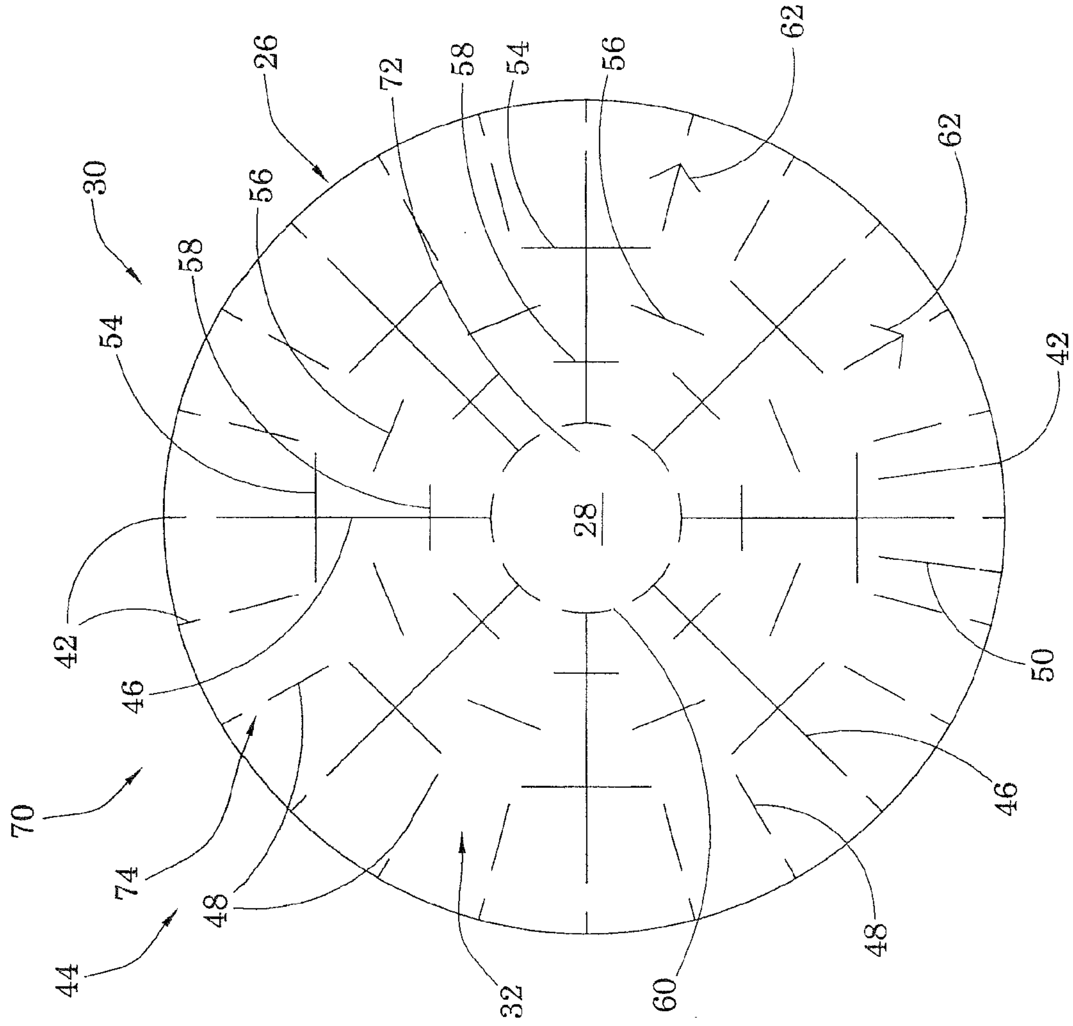
FIG. 2 is a perspective view of the sticker with security arrangement according to the first preferred embodiment of the present invention.

Referring to FIGS. 1 and 2 of the drawings, a sticker, including elongated tape like stickers or a roll of tape, according to a first preferred embodiment of the present invention is illustrated, wherein the sticker comprises a backing layer 10 and a sticker body 20 removably attaching to the backing layer 10.

The sticker body 20 comprises an adhesive layer 24 detachably retained on the backing layer 10 and a top layer 22 overlapping on the adhesive layer 24, wherein the top layer has a central jointing zone 72 and an outer flange 26 as a peripheral edge of the top layer 22. In other words, the top layer 22 is carried by the backing layer 10 for being removed therefrom, so as to be placed and attached to a surface of an object, such as a corrugated container, wrapping box, envelopes, or electronic devices etc, for bonding the sticker body 20 thereon via the adhesive layer 24.

The sticker body 20 further has a print area 28 defined within the outer flange 26, wherein the outer flange 26 is formed via being cut through the top layer 22 and the adhesive layer 24 to form a predetermined shape and size of the sticker body 20, so that the sticker body 20 is able to be removed for transferring to the desired object surface for sealing or labeling purposes. Accordingly, the top layer 22 is made of printable material and defines the print area 28 within the outer flange 26 for identification purpose.

Therefore, the outer flange 26 of the sticker body 20 defines the predetermined size and shape thereof in accordance with the application of the sticker. The print area 28 on the top layer 22 within the outer flange 26 is preferably provided for forming a predetermined graphics thereon, such as a logo, bar codes, marks, words, or any other patterns for labeling the object. An identification mark may be further printed on the jointing zone 72, so that the sticker is able to be attached to the desired object for labeling or identification purpose.

Accordingly, the sticker further comprises a security arrangement 30 provided on the top layer 22 of the sticker body 20, wherein the security arrangement 30 cuts at the top layer 22 of the sticker body 20 that the security arrangement 30 cuts through the top layer 22 only and stops at the adhesive layer 24 to ensure the sticker body 20 being completely removed from the backing layer 10 without tearing the top layer 22 apart.

Accordingly, the cut of the security arrangement 30 is formed at the top layer 22 to define a cutting area such that the security arrangement 30 is arranged to form a weakened portion on the sticker body 20. The top layer 22 further has a plurality of connecting joints 70, which are the partial non-cut area on the top layer 22, provided between two or more cuts of the security arrangement 30 for interconnecting therewith, so as to maintain the completion of the top surface during transferring the sticker body 20 from the backing layer 10 to the object surface.

It is worth to mention that the weakened portion of the top layer 22 formed by the security arrangement 30 is able to prevent and recognize the removed sticker for security purpose. For example, the sticker body 20 is attached on an opening edge of a casing of an electronic device to prevent the sticker being removed when the casing is opened in an unauthorized manner. The sticker, as another example, may be attached on a wrapping box for sealing purpose, so that the sticker body 20 with the security arrangement 30 is able to prevent and recognize if the box is being illegally opened.

It will be readily appreciated by one skilled in the art that the security arrangement 30 is preferably being formed at the top layer 22 via die cutting technology, which is able to cut through the top layer 22 of the sticker body 20 as the designed cutting patterns by the computer programs.

As best shown in FIG. 2, the security arrangement 30 comprises a plurality of lead edge notches 42 and a cutting line structure 40.

The lead edge notches 42 are evenly provided along the outer flange 26 of the top layer 22 towards the jointing zone 72 thereof for lead splitting and tearing the top layer 22. Accordingly, after the sticker body 20 is placed and attached onto the desired object surface, an external tearing force applied at the sticker body 20 for removing the sticker body 22 from the object surface will tear the sticker body 20 along the lead edge notches 42, so as to damage the removed sticker for recognizing purpose.

Accordingly, the lead edge notches 42 can be a plurality of lead edge cuts provided along the outer flange 26, wherein each of the lead edge cuts is formed in V-shape, wherein a vertex of the V-shaped lead edge cut is pointing toward the jointing zone 72 of the top layer 22, while an opening of the V-shaped lead edge cut is formed along the outer flange 26 of the sticker body 20, such that the lead edge cuts are able to concentrate the tearing force at the vertex to tear the sticker body 20.

The cutting line structure 40 is formed at the top layer 22 between the outer flange 26 and the jointing zone 72 in such a manner that after the sticker body 20 is completely removed from the backing layer 10 and is applied for sticking on the object surface, the sticker body 20 becomes a self-destructive layer by the security arrangement 30 to be torn apart at the time when the sticker body 20 is removed from the object surface so as to ensure the sticker body 20 being unable to be removed completely from the object surface.

As shown in FIG. 2, the sticker body 20 has a circular shape that the outer flange 26 is formed at an outer circumferential edge of the top layer 22 and the jointing zone 72 is formed at a center portion of the top layer 22. It is appreciated that the sticker body 20 may be any other shapes, such as triangular, rectangular, or ellipse.

According to the preferred embodiment, the cutting line structure 40 comprises a guide cut structure 44 provided at the top layer 22 for splitting the top layer once the sticker body 20 is attempted for being peeled from the object surface, wherein the guide cut structure 44 is extended from the jointing zone 72 towards the outer flange 26 at a position that the guide cut structure 44 is aligned with each of the lead edge notches 42 for further weakening the top layer 22 through the guide cut structure 44. Accordingly, the guide cut structure 44 comprises a plurality of main guide cuts 46 extended from the jointing zone 72 towards the outer flange 26, and a plurality of supporting guide cuts 48 alternating with the main guide cuts 46.

As shown in FIG. 2, the main guide cuts 46 and the supporting guide cuts 48 are radially extended from the jointing zone 72 towards the outer flange 26 to align with the lead edge notches 42. Preferably, a length of each of the main guide cuts 46 is longer than a length of each of the supporting guide cuts 48. In other words, the main guide cuts 46 and the supporting guide cuts 48 are pointing towards the outer flange 26 of the top layer 22.

It is worth to mention that guide cut structure 44 is radially extended form the jointing zone 72 toward the outer flange 26 of the sticker body 20, so that when the sticker body 20 is being removed from the object surface, the sticker body 20 is relatively easier to be tore along any of the guide cut structure 44 in accordance with the direction that a tearing force applied on the sticker body 20. More specifically, the main guide cuts 46 and the supporting guide cuts 48 of the radial guide cut structure 44 are straight lines or curved lines extended radially at the sticker body 20 to form parts of the security arrangement 30 thereon.

It is appreciated that the lead edge notches 42 and the guide cut structure 44 are arranged to efficiently being tore to split the top layer 22, so as to damage the sticker body 20. One or more guide cut structures 44 are preferably extended in the radial manner to align with the lead edge notches 42, such that when the external tearing force for against a bonding force between the adhesive layer 24 and the object surface, the lead edge notches 42 spacedly provided along the outer flange 26 of the top layer 22 is leading the tearing force along the guide cut structure 44 for all the way pointing toward the central area of the sticker body 20 to easily spilt, damage, and tear the sticker body 20.

The guide cut structure 44 is preferably aligning with each of the lead edge notches 42 respectively to form a tiny gap of a bridge joint 74 of the connecting joints 70 therebetween, wherein the gap is preferably embodied around 1/16", so that the bridge joints 74, which are interconnected the non cutting portion of the top layer 22, are able to maintain the originally integral shape of the sticker body 20 during the transforming the sticker body 20 from the backing layer 10 to the object surface while being able to easily being broken through thereof to form the security arrangement 30.

Accordingly, the guide cut structure 44 preferably comprises a plurality of relatively longer main guide cuts 46 and shorter supporting guide cuts 48, wherein the main guide cuts 46 are preferably aligning with each of the lead edge notches 42 to extend from the bridge joint 74 all the way to an outer peripheral edge of the jointing zone 72. Meanwhile, the supporting guide cuts 48 having a length shorter than the main guide cuts 46 are preferably aligning with each of the lead edge notches 42 respectively to extend from the bridge joint 74 toward the jointing zone 72. In other words, the main guide cuts 46 and the supporting guide cuts 48 are extended in a random tearing area 32 between the outer flange 26 and the outer peripheral edge of the jointing zone 72, wherein the main and supporting guide cuts 46, 48 are alternatively and radially extended in the random tearing area 32, so as to be tore along the main and supporting guide cuts 46, 48.

It is appreciated that the guide cut structure 44 may be aligned or misaligned with lead edge notches 42. The main guide cuts 46 and the supporting guide cuts 48 are preferably aligned with the lead edge notches 42, so that when the tearing force is applied at the outer flange 26 of the sticker body 20, each of the lead edge notch 42 is able to guide the tearing force to split the sticker body 20 along the main guide cuts 46 or supporting guide cuts 48. Therefore, the removed sticker body 20 being re-attached onto the object surface will be recognized via the mark of the twisted, split, or damaged sticker resulted from the weakened cutting line structure 40 of the security arrangement 30.

As mentioned above, the guide cut structure 44 further comprise a plurality of dotted guide cuts 50 radially extended from the outer flange 26 toward the jointing zone 72 of the top layer 22, so as to further weaken the main cutting area 32 of the top layer 22 of the sticker body 20. Preferably, the dotted guide cuts 50 are randomly formed at the top layer 22 and extended from the outer flange 26 at a position that the dotted guide cuts 50 are aligned between two neighboring lead edge notches 42.

Accordingly, the cutting line structure 40 further comprises one or more dotted cut structure 52 coaxially formed on the top layer 22 between the jointing zone 72 and the outer flange 26, wherein the dotted cut structure 52 can be formed of straight lines or curved lines discontinuously provided at the main cutting area 32 of the top layer 22. The dotted cut structure 52 is substantially perpendicularly to the guide cut structure 44.

In order to further illustrate the dotted cut structure 52, the dotted cut structure 52 of the first preferred embodiment further comprises a plurality of inner dotted cuts 58 coaxially encircling with the jointing zone 72, a plurality of middle dotted cuts 56 coaxially encircling with the inner dotted cuts 58, and a plurality of outer dotted cuts 54 coaxially encircling with the middle dotted cuts 56.

Accordingly, the inner dotted cuts 58 are preferably straight lines substantially formed at the random tearing area 32 at a position adjacent to the jointing zone 72. Thus, the inner dotted cuts 58 are formed a substantial inner circle at the random tearing area 32, which are not necessary to perfectly coaxial with the middle and outer dotted cuts 54, 56.

The outer dotted cuts 54 are straight or curved lines, embodied as straight lines, are discontinuously formed at the main cutting area 32 at a position adjacent to the outer flange 26 to form an outer circle configuration. The middle dotted cuts 56 are straight or curved lines, embodied as straight lines, discontinuously formed at the main cutting area 32 at a position between the inner dotted cuts 58 and the outer dotted cuts 54.

Accordingly, the inner dotted cuts 58, the middle dotted cuts 56, and the outer dotted cuts 54 are a plurality of discontinued cuts that the inner dotted cuts 58 are misaligned with the middle dotted cuts 56 along a radial direction while the middle dotted cuts 56 are misaligned with the outer dotted cuts 54 along a radial direction. Preferably, a length of each of the inner dotted cuts 58 is shorter than a length of each of the middle dotted cuts 56 which is shorter than a length of each of the outer dotted cuts 54.

As mentioned above, the dotted cut structure 52 may be alternatively or selectively intersected with another cutting line structure 40, wherein the dotted cut structure 52 may be intersected or non intersected with the main guide cuts 46 or supporting guide cuts 48 to further weaken the cutting line structure 40 of the security arrangement 30 for splitting the top layer 22, while maintaining the completion of the top layer 22 during transferring the sticker body 20 from the backing layer 10 to the object surface. Preferably, at least one of the inner dotted cuts 58, the middle dotted cuts 56, and the outer dotted cuts 54 is intersected with one of the main guide cuts 46 and the supporting guide cuts 48.

According to the preferred embodiment, the dotted cut structure 52 further comprises a plurality of dotted center ring cuts 60 coaxially formed on the top layer 22 to define the jointing zone 72 within the dotted center ring cuts 60. The dotted center ring cuts 60 are a plurality of discontinued cuts to form a circular configuration at the top layer 22. In other words, the dotted center ring cuts 60 are shortly dotted cuts surrounding the non-cutting area of the jointing zone 72. In addition, the dotted center ring cuts 60 are preferably intersected with the main guide cuts 46 respectively.

Accordingly, the cutting line structure 40 further comprises a plurality of starburst cuts 62 provided at the top layer 22 at a position that each of the starburst cuts 62 is intersected with one of the main guide cuts 46 and the supporting guide cuts 48 for easily separation the top layer 22 from the backing layer 10 without damage or splitting the top layer 22 while removing the sticker body 20 from the backing layer 10. Preferably, each of the starburst cuts 60 is arrow shaped and selectively pointing at one or more of the respective lead edge notches 42, such that the sticker body 20 is able to be easily separated from the starburst cuts 62 without splitting the top layer 22 while transferring of the sticker body 20.

In other words, the starburst cuts 62 are preferably provided in a random tearing area 32 between the main guide cuts 46 and the supporting guide cuts 48. Thus, the starburst cuts 62 may provide at the random tearing area 32 at a position between the main guide cut 46 and the supporting guide cut 48 to align with the lead edge notch 42, or provided at the random tearing area 32 at a position in a front inner end of the supporting guide cuts 48 to align with the respective supporting guide cuts 48.

The adhesive layer 24 of the sticker body 20 may be a non self adhesive layer or self adhesive layer coated underneath of the top layer 22 at a position being sandwiched between the backing layer 10 and the top layer 22 before the sticker body 20 is being transformed to the object surface. An adhesion of the non self adhesive layer will be able to activate the adhesion for being attached onto the desired object surface. The self adhesive layer is able to automatically be attached onto the object surface when the sticker body 20 is being removed from the backing layer 10. Therefore, the top layer 22 is able to be supported via the adhesive layer 24 while transferring the sticker body 20.

Figure 3:
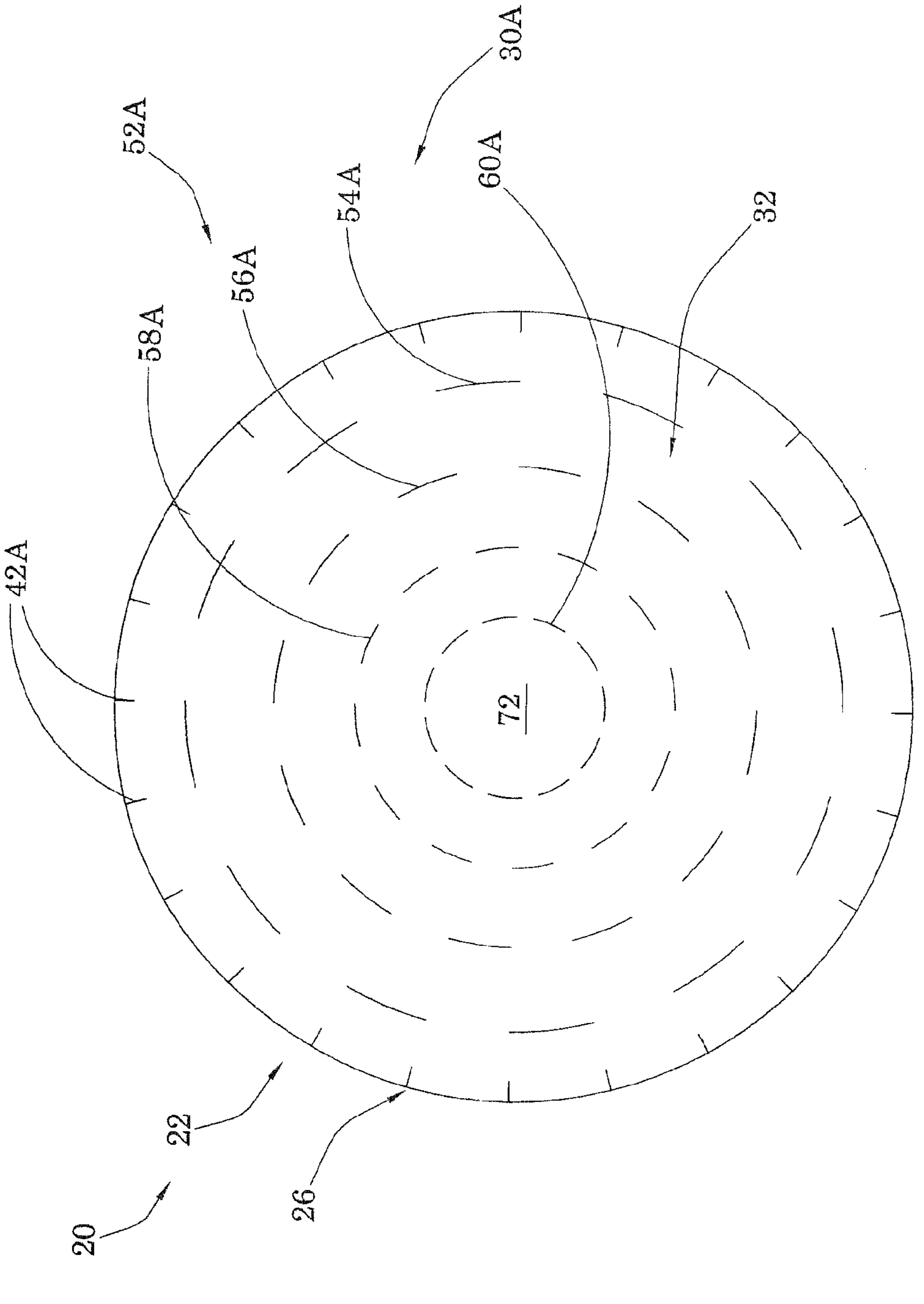
FIG. 3 is a perspective view of a first alternative sticker according to the first preferred embodiment of the present invention.
Figure 4:
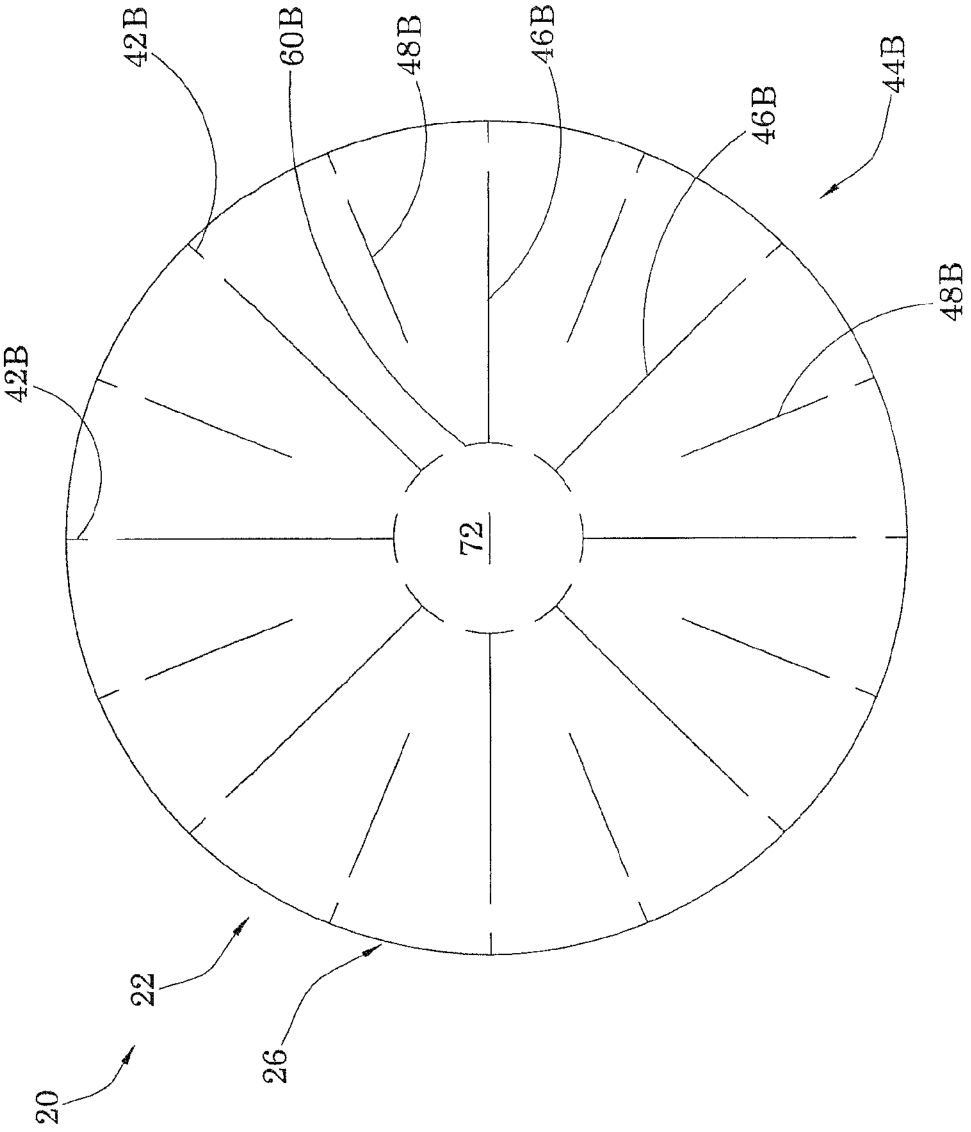
FIG. 4 is a perspective view of a second alternative sticker according to the first preferred embodiment of the present invention.

Referring to FIGS. 3 and 4 of the drawings, first and second alternative modes of the present invention are illustrated respectively to simplify the security arrangement 30A, 30B at the sticker body 20 that can minimize the manufacturing cost of the sticker. As shown in FIG. 3, the security arrangement 30A only has the lead edge notches 42A and the dotted cut structure 52A.

Accordingly, the lead edge notches 42A are evenly provided along the outer flange 26 of the top layer 22 towards the jointing zone 72 thereof for lead splitting and tearing the top layer 22. Accordingly, after the sticker body 20 is placed and attached onto the desired object surface, an external tearing force applied at the sticker body 20 for removing the sticker body 22 from the object surface will tear the sticker body 20 along the lead edge notches 42A, so as to damage the removed sticker for recognizing purpose.

The dotted cut structure 52A comprises a plurality of inner dotted cuts 58A coaxially encircling with the jointing zone 72, a plurality of middle dotted cuts 56A coaxially encircling with the inner dotted cuts 58A, and a plurality of outer dotted cuts 54 coaxially encircling with the middle dotted cuts 56A.

The inner dotted cuts 58A are preferably straight lines substantially formed at the random tearing area 32 at a position adjacent to the jointing zone 72. Thus, the inner dotted cuts 58A are formed a substantial inner circle at the random tearing area 32, which are not necessary to perfectly coaxial with the middle and outer dotted cuts 54A, 56A.

The outer dotted cuts 54A are straight or curved lines, embodied as straight lines, are discontinuously formed at the random tearing area 32 at a position adjacent to the outer flange 26 to form an outer circle configuration. The middle dotted cuts 56A are straight or curved lines, embodied as straight lines, discontinuously formed at the main cutting area 32A at a position between the inner dotted cuts 58A and the outer dotted cuts 54A.

Accordingly, the inner dotted cuts 58A, the middle dotted cuts 56A, and the outer dotted cuts 54A are a plurality of discontinued cuts that the inner dotted cuts 58A are misaligned with the middle dotted cuts 56A along a radial direction while the middle dotted cuts 56A are misaligned with the outer dotted cuts 54A along a radial direction. Preferably, a length of each of the inner dotted cuts 58A is shorter than a length of each of the middle dotted cuts 56A which is shorter than a length of each of the outer dotted cuts 54A.

The dotted cut structure 52A further comprises a plurality of dotted center ring cuts 60A coaxially formed on the top layer 22 to define the jointing zone 72 within the dotted center ring cuts 60A. The dotted center ring cuts 60A are a plurality of discontinued cuts to form a circular configuration at the top layer 22. In other words, the dotted center ring cuts 60A are shortly dotted cuts surrounding the non-cutting area of the jointing zone 72.

As shown in FIG. 4, the security arrangement 30B only has the lead edge notches 42B, the guide cut structure 44B, and a plurality of dotted center ring cuts 60B.

The lead edge notches 42B are evenly provided along the outer flange 26 of the top layer 22 towards the jointing zone 72 thereof for lead splitting and tearing the top layer 22. Accordingly, after the sticker body 20 is placed and attached onto the desired object surface, an external tearing force applied at the sticker body 20 for removing the sticker body 22 from the object surface will tear the sticker body 20 along the lead edge notches 42B, so as to damage the removed sticker for recognizing purpose.

The guide cut structure 44B provided at the top layer 22 for splitting the top layer once the sticker body 20 is attempted for being peeled from the object surface, wherein the guide cut structure 44B is extended from the jointing zone 72 towards the outer flange 26 at a position that the guide cut structure 44B is aligned with each of the lead edge notches 42B for further weakening the top layer 22 through the guide cut structure 44B. Accordingly, the guide cut structure 44B comprises a plurality of main guide cuts 46B extended from the jointing zone 72 towards the outer flange 26, and a plurality of supporting guide cuts 48B alternating with the main guide cuts 46B.

As shown in FIG. 2, the main guide cuts 46B and the supporting guide cuts 48B are radially extended from the jointing zone 72 towards the outer flange 26 to align with the lead edge notches 42B. Preferably, a length of each of the main guide cuts 46B is longer than a length of each of the supporting guide cuts 48B. In other words, the main guide cuts 46B and the supporting guide cuts 48B pointing towards the outer flange 26 of the top layer 22.

It is worth to mention that guide cut structure 44B is radially extended form the jointing zone 72 toward the outer flange 26 of the sticker body 20, so that when the sticker body 20 is being removed from the object surface, the sticker body 20 is relatively easier to be tore along any of the guide cut structure 44B in accordance with the direction that a tearing force applied on the sticker body 20. More specifically, the main guide cuts 46B and the supporting guide cuts 48B of the radial guide cut structure 44B are straight lines or curved lines extended radially at the sticker body 20 to form parts of the security arrangement 30 thereon.

It is appreciated that the lead edge notches 42B and the guide cut structure 44B are arranged to efficiently being tore to split the top layer 22, so as to damage the sticker body 20. One or more guide cut structures 44B are preferably extended in the radial manner to align with the lead edge notches 42B, such that when the external tearing force for against a bonding force between the adhesive layer 24 and the object surface, the lead edge notches 42B spacedly provided along the outer flange 26 of the top layer 22 is leading the tearing force along the guide cut structure 44B for all the way pointing toward the central area of the sticker body 20 to easily spilt, damage, and tear the sticker body 20.

Accordingly, the guide cut structure 44B preferably comprises a plurality of relatively longer main guide cuts 46B and shorter supporting guide cuts 48B, wherein the main guide cuts 46B are preferably aligning with each of the lead edge notches 42B to extend from the bridge joint 74 all the way to an outer peripheral edge of the jointing zone 72. Meanwhile, the supporting guide cuts 48B having a length shorter than the main guide cuts 46B are preferably aligning with each of the lead edge notches 42B respectively to extend from the bridge joint 74 toward the jointing zone 72. In other words, the main guide cuts 46B and the supporting guide cuts 48B are extended in a random tearing area 32 between the outer flange 26 and the outer peripheral edge of the jointing zone 72, wherein the main and supporting guide cuts 46B, 48B are alternatively and radially extended in the random tearing area 32, so as to be tore along the main and supporting guide cuts 46B, 48B.

It is appreciated that the guide cut structure 44B may be aligned or misaligned with lead edge notches 42B. The main guide cuts 46B and the supporting guide cuts 48B are preferably aligned with the lead edge notches 42B, so that when the tearing force is applied at the outer flange 26 of the sticker body 20, each of the lead edge notch 42B is able to guide the tearing force to split the sticker body 20 along the main guide cuts 46B or supporting guide cuts 48B. Therefore, the removed sticker body 20 being re-attached onto the object surface will be recognized via the mark of the twisted, split, or damaged sticker resulted from the weakened security arrangement 30B.

The dotted center ring cuts 60B coaxially formed on the top layer 22 to define the jointing zone 72 within the dotted center ring cuts 60B. The dotted center ring cuts 60B are a plurality of discontinued cuts to form a circular configuration at the top layer 22. In other words, the dotted center ring cuts 60B are shortly dotted cuts surrounding the non-cutting area of the jointing zone 72. In addition, the dotted center ring cuts 60B are preferably intersected with the main guide cuts 46B respectively.

Figure 5:
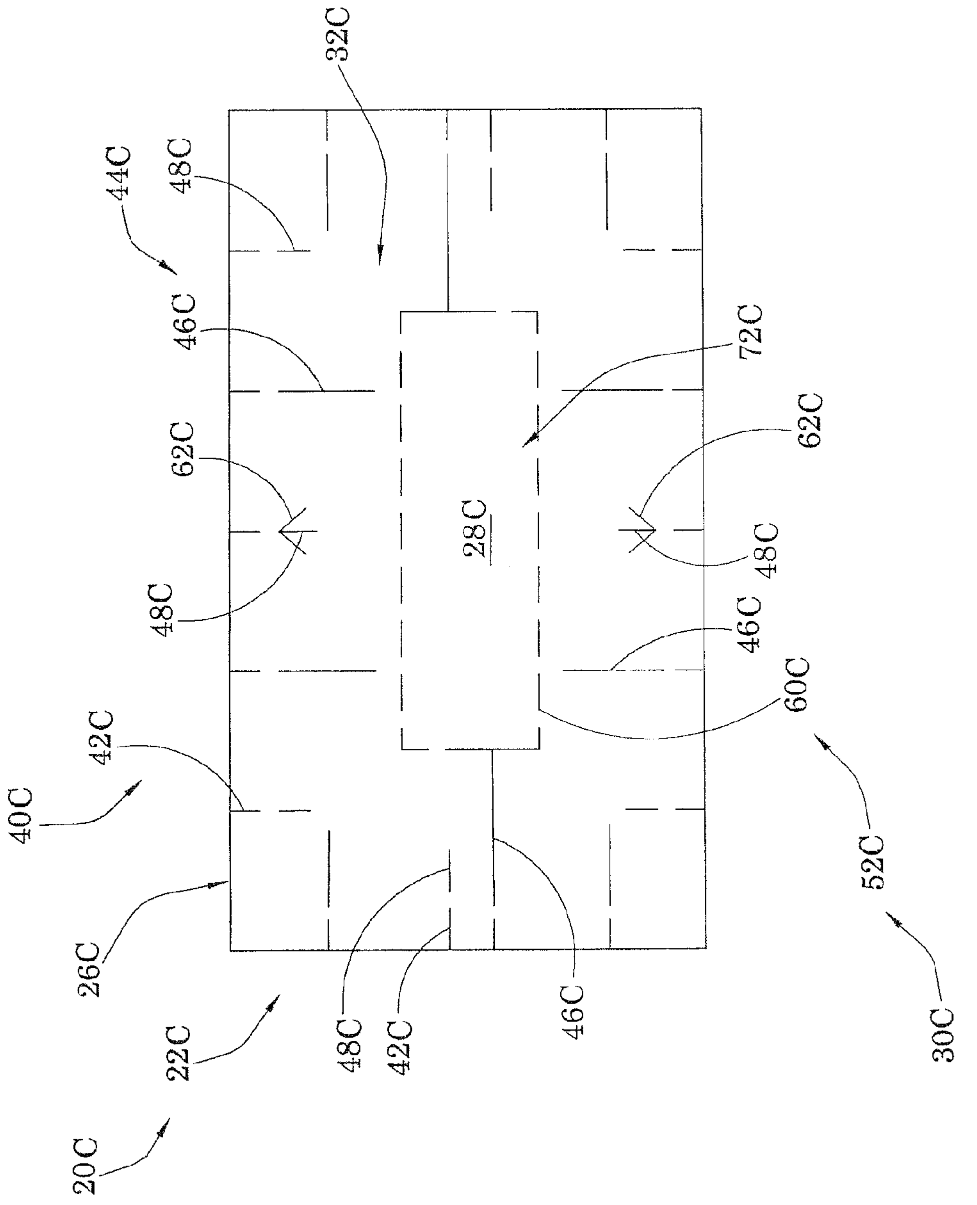
FIG. 5 is a perspective view of a sticker with security arrangement according to a second preferred embodiment of the present invention.

Referring to FIG. 5, a third alternative of the sticker according to the first preferred embodiment of the present invention is illustrated, wherein the sticker body 20C has a rectangular shape defining a rectangular shaped outer flange 26C and a corresponding rectangular shaped central jointing zone 72C on the top layer 22C. The print area 28C is defined within the outer flange 26C of the top layer 22C. The security arrangement 30C comprises a plurality of lead edge notches 42C and a cutting line structure 40C.

The lead edge notches 42C are evenly provided along the outer flange 26C of the top layer 22C towards the jointing zone 72C thereof for lead splitting and tearing the top layer 22C. As shown in FIG. 5, the lead edge notches 42C are parallelly and evenly formed at each peripheral edge of the outer flange 26C of the top layer 22C towards the jointing zone 72C.

The cutting line structure 40C is formed at the top layer 22C between the outer flange 26C and the jointing zone 72C, wherein the cutting line structure 40 comprises a guide cut structure 44C provided at the top layer 22C for splitting the top layer once the sticker body 20C is attempted for being peeled from the object surface. The guide cut structure 44C is extended from the jointing zone 72C towards the outer flange 26C at a position that the guide cut structure 44C is aligned with each of the lead edge notches 42C for further weakening the top layer 22C through the guide cut structure 44C. Accordingly, the guide cut structure 44C comprises a plurality of main guide cuts 46C extended from the jointing zone 72C towards the outer flange 26C, and a plurality of supporting guide cuts 48C alternating with the main guide cuts 46C.

As shown in FIG. 5, the main guide cuts 46C and the supporting guide cuts 48C are parallelly extended from the jointing zone 72C towards the outer flange 26C to align with the lead edge notches 42C. Preferably, a length of each of the main guide cuts 46C is longer than a length of each of the supporting guide cuts 48C. In other words, the main guide cuts 46C and the supporting guide cuts 48C are pointing towards the outer flange 26C of the top layer 22C.

It is worth to mention that guide cut structure 44C is radially projected form the jointing zone 72C toward the outer flange 26C of the sticker body 20C, so that when the sticker body 20C is being removed from the object surface, the sticker body 20C is relatively easier to be tore along any of the guide cut structure 44C in accordance with the direction that a tearing force applied on the sticker body 20C. More specifically, the main guide cuts 46C and the supporting guide cuts 48C of the radial guide cut structure 44C are straight lines extended at the sticker body 20C to form parts of the security arrangement 30C thereon.

The dotted cut structure 52C comprises a plurality of dotted center ring cuts 60C formed on the top layer 22C to define the jointing zone 72C within the dotted center ring cuts 60C. The dotted center ring cuts 60C are a plurality of discontinued cuts to form a rectangular configuration at the top layer 22C. In other words, the dotted center ring cuts 60C are shortly dotted cuts surrounding the non-cutting area of the jointing zone 72C. In addition, the dotted center ring cuts 60 are preferably intersected with the main guide cuts 46C respectively. The starburst cuts 62C are preferably provided in a random tearing area 32 aligning with the supporting guide cut 48C.

Figure 6:
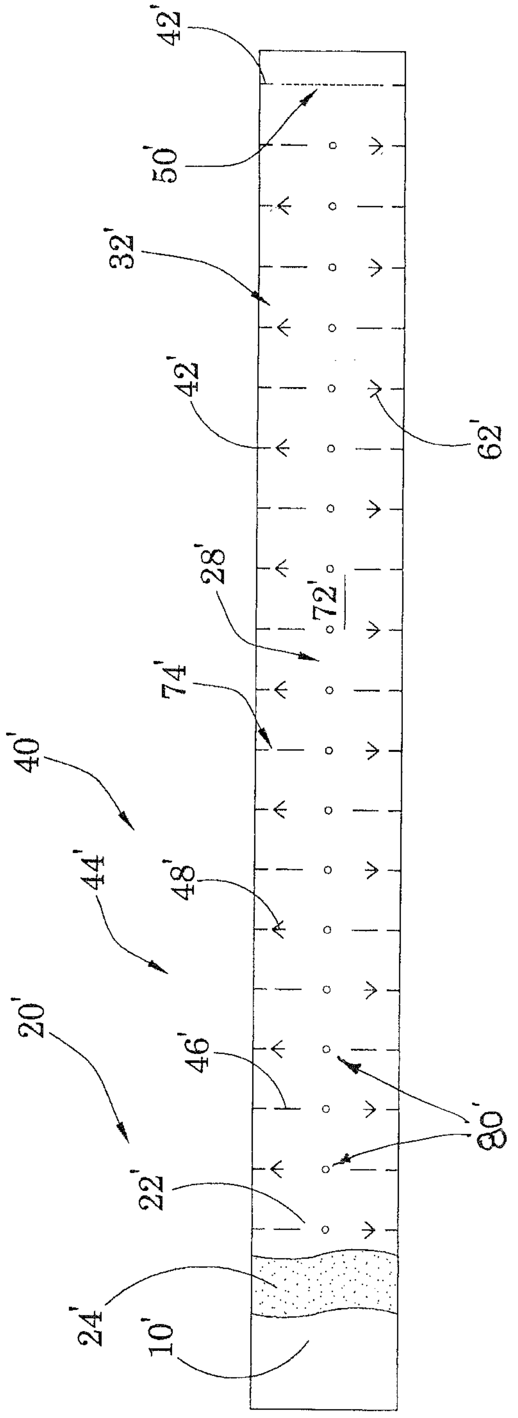
FIG. 6 is a perspective view of an alternative sticker with security arrangement according to the above preferred embodiment of the present invention.

Referring to FIG. 6 of the drawings, a sticker according to a second embodiment illustrates another alternative mode of the first embodiment of the present invention, wherein the sticker, having similar structure of the first embodiment, has the backing layer 10', sticker body 20', and a security arrangement 30'. The sticker has an elongated shape to form a tape like structure of the sticker, so that the sticker is able to be cut to a desired length of the sticker. The security arrangement 30' comprises a plurality of lead edge notches 42' and a cutting line structure 40'.

The sticker body 20' comprises an adhesive layer 24' detachably retained on the backing layer 10' and a top layer 22' overlapping on the adhesive layer 24', wherein the top layer has a central jointing zone 72' and an outer flange 26' as a peripheral edge of the top layer 22'.

As shown in FIG. 6, the sticker body 20' has a rectangular shape defining the rectangular shaped outer flange 26' and the corresponding rectangular shaped jointing zone 72' on the top layer 22'. The print area 28' is defined within the outer flange 26' of the top layer 22'. The print area 28' is provided at the elongated middle portion of the top layer 22', wherein a plurality of barcoded printed lines can be printed thereat, so that the sticker is able to be securely attached for labeling and integrating with the IT system of a company. The print area 28' may also have figures, numbers, letters, or the likes according to the designed function of the stickers.

The lead edge notches 42' are evenly provided along the outer flange 26' of the top layer 22' towards the jointing zone 72' thereof for lead splitting and tearing the top layer 22'. Accordingly, after the sticker body 20' is placed and attached onto the desired object surface, an external tearing force applied at the sticker body 20' for removing the sticker body 22' from the object surface will tear the sticker body 20' along the lead edge notches 42', so as to damage the removed sticker for recognizing purpose. The lead edge notches 42' can be parallelly and evenly formed at each longitudinal peripheral edge of the outer flange 26' of the top layer 22' towards the jointing zone 72'.

The cutting line structure 40' is formed at the top layer 22' between the outer flange 26' and the jointing zone 72', wherein the cutting line structure 40' comprises a guide cut structure 44' provided at the top layer 22' for splitting the top layer once the sticker body 20' is attempted for being peeled from the object surface. The guide cut structure 44' is extended from the jointing zone 72' towards the outer flange 26' at a position that the guide cut structure 44' is aligned with each of the lead edge notches 42' for further weakening the top layer 22' through the guide cut structure 44'. Accordingly, the guide cut structure 44' comprises a plurality of main guide cuts 46' extended from the jointing zone 72' towards the outer flange 26', and a plurality of supporting guide cuts 48' alternating with the main guide cuts 46'.

As shown in FIG. 6, the main guide cuts 46' and the supporting guide cuts 48' are parallelly extended from the jointing zone 72' towards the outer flange 26' to align with the lead edge notches 42'. Preferably, a length of each of the main guide cuts 46' is longer than a length of each of the supporting guide cuts 48'. In other words, the main guide cuts 46' and the supporting guide cuts 48' are pointing towards the outer flange 26' of the top layer 22'. The guide cut structure 44' is preferably aligning with each of the lead edge notches 42' respectively to form a tiny gap of a bridge joint 74' therebetween.

The guide cut structure 44' further comprise a plurality of dotted guide cuts 50' radially extended from the outer flange 26' toward the jointing zone 72' of the top layer 22', so as to further weaken the random tearing area 32' of the top layer 22' of the sticker body 20'. Preferably, the dotted guide cuts 50' are randomly formed at the top layer 22' and extended from the outer flange 26' at a position that the dotted guide cuts 50' are parallelly aligned between two respective lead edge notches 42'. It is worth to mention that the dotted guide cuts 50' may be cut through the top layer 22' only or cut through both of the top layer 22' and the adhesive layer 24' for easily being torn along the dotted guide cut 50' to form a desired length of the tape like sticker in a tool less manner.

Accordingly, the cutting line structure 40' further comprises a plurality of starburst cuts 62' provided at the top layer 22' at a position that each of the starburst cuts 62' is intersected with one of the main guide cuts 46' and the supporting guide cuts 48' for easily separation the top layer 22' from the backing layer 10' without damage or splitting the top layer 22' while removing the sticker body 20' from the backing layer 10'. Preferably, each of the starburst cuts 60' is arrow shaped and selectively pointing at one or more of the respective lead edge notches 42', such that the sticker body 20' is able to be easily separated from the starburst cuts 62' without splitting the top layer 22' while transferring of the sticker body 20'.

In other words, the starburst cuts 62' are preferably provided in a random tearing area 32' between the main guide cuts 46' and the supporting guide cuts 48'. Thus, the starburst cuts 62' may provide at the random tearing area 32' at a position between the main guide cut 46' and supporting guide cut 48' to align with the lead edge notch 42, or provided at the random tearing area 32' at a position in a front inner end of the supporting guide cuts 48' to align with the respective supporting guide cuts 48'.

The elongated tape-shaped sticker of rectangular sticker is preferably made by a tamper proof tape with self adhesive or gum type adhesive layer 24', so that the sticker is able to be attached to most of the object surface and preventing peeling off therefrom due to the changes of the weather, such as hot, cold, or high humidity of the air.

A plurality of dotted guide cuts or dotted cuts 80' may further longitudinally provided at an elongated central portion of the rectangular sticker, wherein the dotted cut 80' are preferably cutting through both the top layer 22' and the adhesive layer 24', so that each of the dotted cuts 80' is able to destroy the mechanical structure of the sticker material by forming an initial crack of the dotted cuts 80', so as for weaken the strength of the sticker for the mentioned security purpose while being able to be torn at each dotted cut 80' in the tool less manner. In other words, the initial crack of the dotted cuts 80' enables the user to apply a relatively small amount of tearing force for forming a fracture to tear the tape sticker into a plurality of fragments of stickers.

Accordingly, the variety of cuts of the security arrangement 30 in the above embodiment and alternatives are interchangeable.

Figure 7:
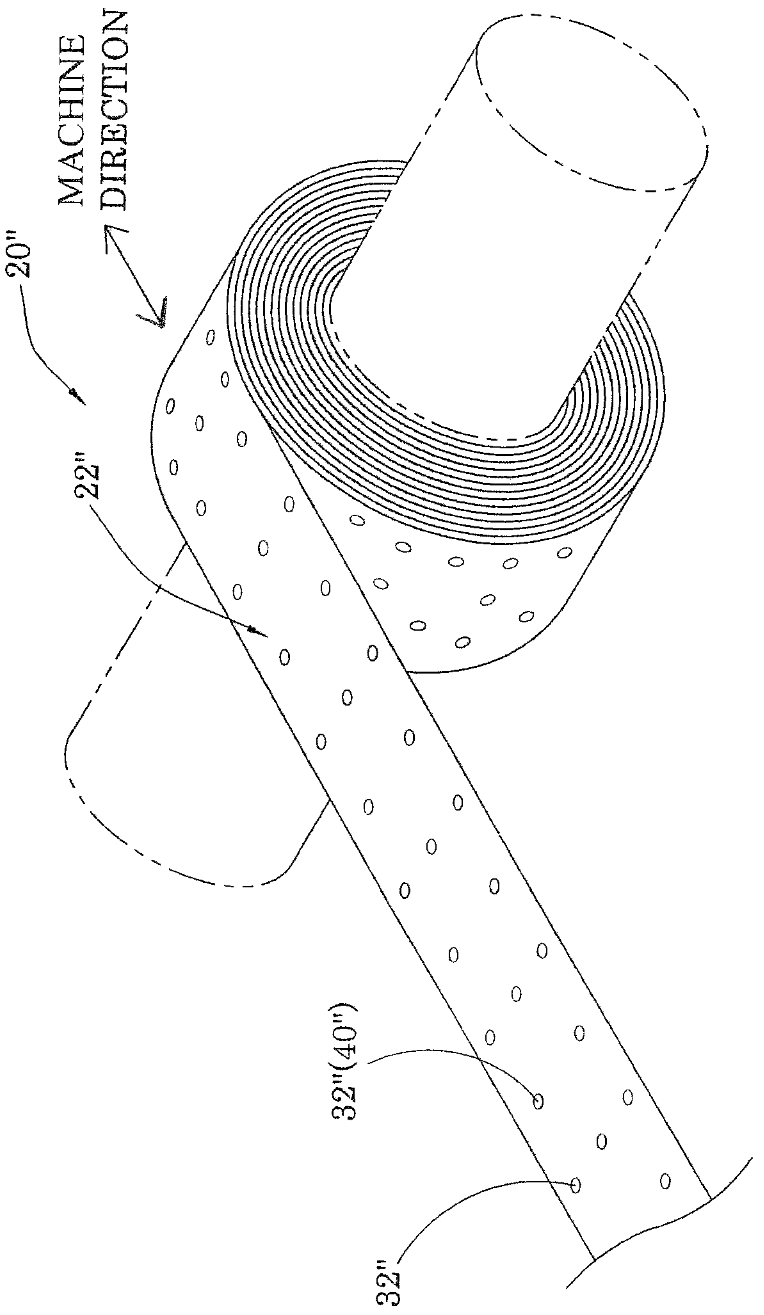
FIG. 7 is a perspective view of a sticker with security arrangement according to another preferred embodiment of the present invention.

Referring to FIG. 7 of the drawings, a sticker according to a third preferred embodiment of the present invention is illustrated, wherein the sticker has similar structure and functions as mentioned in the above embodiments. However, the sticker has a sticker body 20" and a security arrangement 30", but may not have the backing layer as described in above preferred embodiment. In other words, the sticker body 20" has elongated tape like shape and being wounded to form a roll of sticker.

The body 20" also has a top layer 22" and an adhesive layer 24" (not shown in the FIG. 7) supporting the top layer 22" above the adhesive layer 24" to overlap therewith. For the sake of convenience, the elongated body 20" is being defined to have a longitudinal direction and a transverse direction.

The security arrangement 30" preferably comprises a plurality of dotted cut or dotted guide cut 32" cut through the top layer 22" and/or the adhesive layer 24". The dotted guide cut 32" may be further formed a plurality of cutting lines 40" at the body 20", wherein the dotted guide cut 32" may alignedly and transversely forming along the transverse direction of the body 20", such that the dotted guide cut 32" are preferably forming the plurality of cutting line spacedly and transversely extending at the body 20". Therefore, the tape like shaped body 20" of the sticker is able to be torn along the cutting lines 40" in according to a desired length of the sticker in a tool less manner.

The dotted guide cut 32" may also be formed randomly between the cutting lines 40", such that when the body 20" of the sticker is being torn via one of the cutting lines 40" in accordance with the desired length, the un-torn tear lines 40" and/or other randomly formed dotted guide cut 32" are able to weaken the structure of the body 20" for the above mentioned security purposes. In other words, the dotted guide cut 32" of the security arrangement are able to weaken the structure of the body 20" when an external force is applied to tear the sticker apart the object surface.

Therefore, the sticker 20" is able to be torn along the cutting lines 40" according to the desired length of the sticker while being able to provide the security arrangement 30" to prevent the sticker 20" being illegally torn.

The dotted guide cut 32" of the security arrangement 30" may be formed via the tape like elongated body 20" of the sticker is wounding along a wheel to form the roll. In other words, the body 20" is being pulled in a machine direction along the longitudinal axis of the body 20" to form the roll of the sticker. The dotted guide cut 32" are preferably formed when the elongated body 20" is being wounded at a location at an outer surface of the roll of the sticker, so as to minimize the possibility of the body 20" being damaged while forming the dotted guide cut 32".

For instance, the sticker tape of the third preferred embodiment of the present invention may be made of oriented polypropylene material, wherein the dotted guide cut 32" may be formed essentially and longitudinally along a central portion of the elongated sticker tape. As a result, each of the dotted guide cut 32" is also formed an initial crack to destroy and weaken the original mechanical structure of the sticker, such that oriented polypropylene tape like sticker is able to be hand manipulated to tear the tape sticker along one of transversely oriented structural lines transversely extended through the respective dotted guide cut 32". Therefore, the tape like sticker is able to be torn in accordance to the desired length of the user in the tool less manner.

It should be noted that each of the dotted guide cut 32" may be a pin hole formed via a pinching machine, wherein the pinching machine is able to pinch through the elongated tape like sticker to longitudinally form the pin holes of the dotted guide cut 32" while the tape is being rolled along the machine direction to form the roll of tape.

Therefore, the dotted guide cut 32" may also longitudinally provided at the elongated central portion of the rectangular sticker, wherein the dotted guide cut 32" are preferably cutting through both the top layer 22" and the adhesive layer 24", so that each of the dotted guide cut 32" is able to destroy the mechanical structure of the sticker material by forming an initial crack of the dotted guide cut 32", so as for weaken the strength of the sticker for the mentioned security purpose while being able to be torn at each of dotted guide cut 32" in the tool less manner. In other words, the initial crack of the dotted guide cut 32" enables the user to apply a relatively small amount of tearing force for forming a transversely fracture to tear the tape sticker into a plurality of fragments of stickers, so as to form the security arrangement.

Accordingly, the backing layer of all of above mentioned stickers of present invention are optionally provided for supporting the sticker body thereat, so as to prevent the sticker body 20 being destroyed or cut into smaller pieces of sticker before attaching to the surface of objects. The backing layer 10 may not be provided. For examples, when the tape like sticker is forming the roll of tape, the sticker may be supported by overlapping to the top layer, which may be applied a wax or the like thereat, without the backing layer 10. The sticker body 20 may also have an automatic adhesive film provided at the back side thereof without the backing layer, so that when the sticker is able to be attached to the surface of object, the user may wet the automatic adhesive film to attach the sticker at the surface of object.

It is worth to mention that the security arrangement is able to cut the one piece sticker into a plurality of smaller pieces of sticker after the sticker being attached to the surface of object and being unauthorized detached therefrom. For example, the security arrangement of the sticker is able to form the one single piece sticker into 24 smaller pieces of sticker, so as to achieve the security purposes.

The security arrangement of each of the above mentioned preferred embodiments is preferred to symmetrically form on the sticker body 20, so that the symmetrically arranged security arrangement is able to ensure the sticker body 20 being torn along any cutting lines or dots of the security arrangement from any tearing directions, so as to tear and destroy the sticker body when the sticker is being detached from the object surface in the unauthorized manner.

Figure 8:
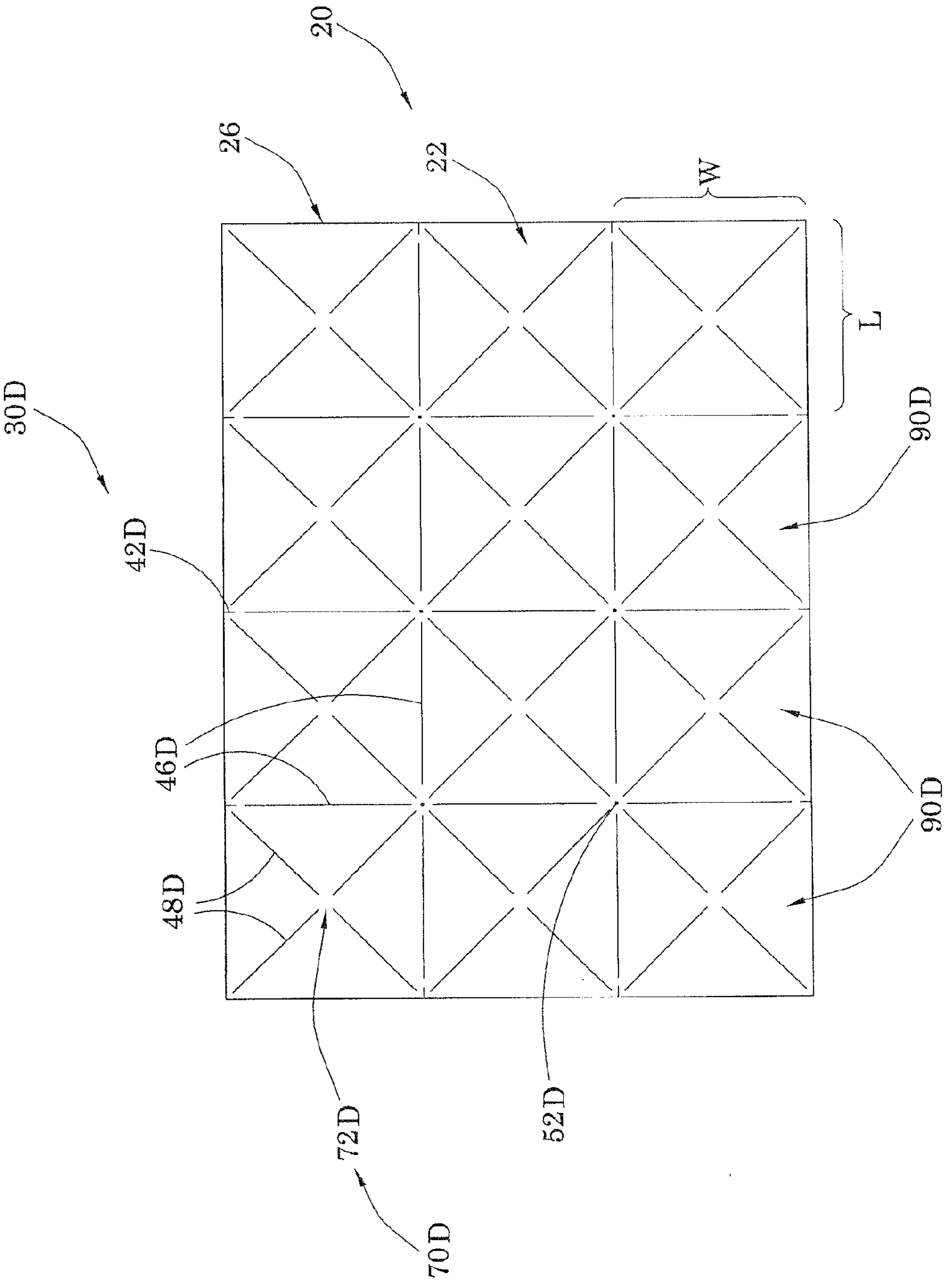
FIG. 8 is a perspective view of a sticker with security arrangement according to still another preferred embodiment of the present invention.

FIG. 8 illustrates another alternative mode of the security arrangement 30D which is provided on the top layer 22 of the sticker body 20, wherein the security arrangement 30 cuts at the top layer 22 of the sticker body 20 that the security arrangement 30 cuts through the top layer 22 only and preferably stops at the adhesive layer 24 to ensure the sticker body 20 being completely removed from the backing layer 10 without tearing the top layer 22 apart, as it is mentioned in the above embodiment. Alternatively, some of the security arrangement 30D can be alternatively or selectively cut through both top layer 22 and adhesive layer 24 in a manner that the sticker body 20 is able to be completely removed while being able to weaken the structure of the sticker body 20 to prevent being removed from the object surface in an unauthorized manner.

Accordingly, the cut of the security arrangement 30D is formed at the top layer 22 to define a cutting area such that the security arrangement 30 is arranged to form a weakened portion on the sticker body 20. The top layer 22 further has a plurality of connecting joints 70D, which are the partial non-cut area on the top layer 22, provided between two or more cuts of the security arrangement 30D for interconnecting therewith, so as to maintain the completion of the top surface during transferring the sticker body 20 from the backing layer 10 to the object surface.

According to the preferred embodiment of the present invention, the security arrangement 30D comprises a plurality of lead edge notches 42D along an outer flange 26 of sticker body 20. Therefore, the lead edge notches 42D are able to initiate the tearing force applied on the sticker body 20 to purposely damage the sticker body 20.

The lead edge notches 42D are evenly or non-evenly provided along the outer flange 26 of the sticker body 20. Preferably, the lead edge notches 42D are evenly formed along each peripheral edges of the outer flange 26 in a perpendicular manner for lead splitting and tearing the top layer 22, so as to damage the removed sticker form the object surface fro recognizing and security purpose.

The security arrangement 30D further comprises a plurality of main guide cuts 46D aligning with respective lead edge notches 42D to define a plurality of sticker sections 90D. In the preferred embodiment, the sections 90D are preferably identical and are formed in quadrilateral shape. Preferably, each section 90D is formed in square shape.

Accordingly, a plurality of supporting guide cuts 48D are preferably further provided at each of the sticker sections 90D. The supporting guide cuts 48D are preferred to discontinuously form at the diagonals of each the rectangular shaped sticker sections 90D. The discontinuous supporting guide cuts 48D at each of the diagonals of sticker sections 90D are also formed a central joint zone 72D of connecting joints 70D at a central portion of each of the sticker sections 90D for interconnecting the security arrangement 30D.

In other words, the supporting guide cuts 48D are radially extended between the outer flange 26D and the joint zone 72D, wherein an outer end of each of supporting cuts 48D preferably forms a gap between the outer end and the outer flange 26D while the opposed inner end of each of supporting cuts 48D formed at a peripheral edge of the joint zone 72D, in such manner that the gap and the joint zone 72D is able to interconnect the non-cutting portion of the sticker body 20, so as to ensure the sticker body 20 being able to be completely removed from backing layer 10.

The security arrangement 30D may further comprises a plurality of dotted cuts 52D preferably formed at a plurality of common corners between the sticker sections 90D at a position discontinuously aligning with the respective main guide cuts 46D. In other words, each dotted cut 52D is located between two neighboring main guide cuts 46D.

It should be noted that the plurality of sticker sections 90D are able to further weaken the structure of sticker body 20 in vary orientations. The length L of each of sticker sections 90D depends on the total length of the sticker body 20, and the width W of each of sticker sections 90D depends on the total width of the sticker body 20. More specifically, each of the sticker sections 90D of sticker body 20 may has a size of 1"×1", which is 1 inch in length and 1 inch in width of each of sticker sections 90 of sticker body 20.

The security arrangement 30D may be interchangeable with the above mentioned security arrangement of other preferred embodiments of the present invention. The sticker body 20 may also form a roll of elongated tape, so that no backing layer 10 is necessary provided for carrying the sticker body 20.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A sticker, comprising:

a sticker body which comprises a top layer and an adhesive layer, wherein said top layer has a jointing zone and an outer flange; and a security arrangement, which cuts at said top layer of said sticker body that said security arrangement cuts through said top layer only and stops at said adhesive layer, wherein said security arrangement comprises:

a plurality of lead edge notches provided along said outer flange of said top layer and extended towards said jointing zone thereof for lead splitting and tearing said top layer; and a cutting line structure formed at said top layer between said outer flange and said jointing zone in such a manner that after said sticker body is applied for sticking on an object surface, said sticker body becomes a self-destructive layer by said security arrangement to be torn apart at the time when said sticker body is removed from said object surface so as to ensure said sticker body being unable to be removed completely from said object surface, wherein said guide cut structure comprises a plurality of main guide cuts extended from said jointing zone towards said outer flange, and a plurality of supporting guide cuts alternating with said main guide cuts, wherein a length of each of said main guide cuts is longer than a length of each of said supporting guide cuts, wherein said cutting line structure further comprises a plurality of starburst cuts provided at said top layer at a position that each of said starburst cuts is intersected with one of said main guide cuts and said supporting guide cuts, wherein each of said starburst cuts is form in V-shape and selectively pointing at one or more of said respective lead edge notches.

2. The sticker, as recited in claim 1, wherein said sticker body has a shape that said main guide cuts and said supporting guide cuts are extended from said jointing zone towards said outer flange.

3. A sticker, comprising:

a sticker body which comprises a top layer and an adhesive layer, wherein said top layer has a jointing zone and an outer flange; and a security arrangement, which cuts at said top layer of said sticker body that said security arrangement cuts through said top layer only and stops at said adhesive layer, wherein said security arrangement comprises:

a plurality of lead edge notches provided along said outer flange of said top layer and extended towards said jointing zone thereof for lead splitting and tearing said top layer;

a cutting line structure formed at said top layer between said outer flange and said jointing zone in such a manner that after said sticker body is applied for sticking on an object surface, said sticker body becomes a self-destructive layer by said security arrangement to be torn apart at the time when said sticker body is removed from said object surface so as to ensure said sticker body being unable to be removed completely from said object surface; and a backing layer, wherein said top layer is detachably retained on said backing layer via said adhesive layer, wherein security arrangement cuts is cutted through said top layer only and stopped at said adhesive layer to ensure said sticker body being completely removed from said backing layer without tearing said top layer apart, wherein said guide cut structure comprises a plurality of main guide cuts and a plurality of supporting guide cuts alternating with said main guide cuts, wherein said cutting line structure further comprises a plurality of starburst cuts provided at said top layer at a position that each of said starburst cuts is intersected with one of said main guide cuts and said supporting guide cuts for easily separation said top layer from said backing layer without damage or splitting said top layer while removing said sticker body from said backing layer, wherein each of said starburst cuts is form in V-shape and selectively pointing at one or more of said respective lead edge notches.

4. A sticker, comprising:

a sticker body which comprises a top layer and an adhesive layer, wherein said top layer has a jointing zone and an outer flange;

a plurality of lead edge notches provided along said outer flange of said top layer and extended towards said jointing zone thereof for lead splitting and tearing said top layer; and a guide cut structure provided at said top layer and aligned with each of said lead edge notches, wherein a bridge joint is formed between said guide cut structure and each of said lead edge notches to interconnect with a non-cutting portion of said top layer for maintaining an original integral shape of said top layer, wherein said guide cut structure comprises a plurality of main guide cuts extended from said jointing zone towards said outer flange, and a plurality of supporting guide cuts alternating with said main guide cuts, wherein a length of each of said main guide cuts is longer than a length of each of said supporting guide cuts.

5. The sticker, as recited in claim 4, wherein said main guide cuts and said supporting guide cuts are aligned with said lead edge notches respectively and are extended from said bridge joints to said jointing zone of said top layer.

6. The sticker, as recited in claim 5, wherein said lead edge notches and said guide cut structure cut through said top layer only and stops at said adhesive layer.

7. The sticker, as recited in claim 6, further comprising a backing layer, wherein said top layer is detachably retained on said backing layer via said adhesive layer.

8. The sticker, as recited in claim 7, wherein said sticker body has an elongated shape that said jointing zone is defined at an elongated central portion of said top layer.

* * * * *